June 4, 1935.    H. D. CHURCH    2,003,677
INTERNAL COMBUSTION ENGINE
Filed Feb. 16, 1931    3 Sheets-Sheet 3

INVENTOR
HAROLD D. CHURCH.
RM Cooper
ATTORNEY

Patented June 4, 1935

2,003,677

UNITED STATES PATENT OFFICE 2,003,677

INTERNAL COMBUSTION ENGINE

Harold D. Church, Cleveland, Ohio, assignor to The White Motor Company, Cleveland, Ohio, a corporation of Ohio Application February 16, 1931, Serial No. 515,910

2 Claims. (Cl. 123—191)

This invention relates to internal combustion engines, and more particularly to internal combustion engines of the poppet valve type.

Due to the fact that the exhaust valves of a poppet valve engine run hotter than the inlet valve, and that the temperature to which a valve obtains increases with its size, it is often necessary in order to obtain the required or desired exhaust facilities in a poppet valve engine to provide the separate cylinders with a plurality of exhaust passages so as to permit the use of exhaust valves of a size that will not become overheated.

It is also often necessary or desirable for other reasons to provide the separate cylinders of an engine with more than two exhaust conduits.

It is an object of this invention to provide a simple and efficient engine construction of the type in which the separate cylinders are provided with more than two exhaust conduits.

Figure 1:
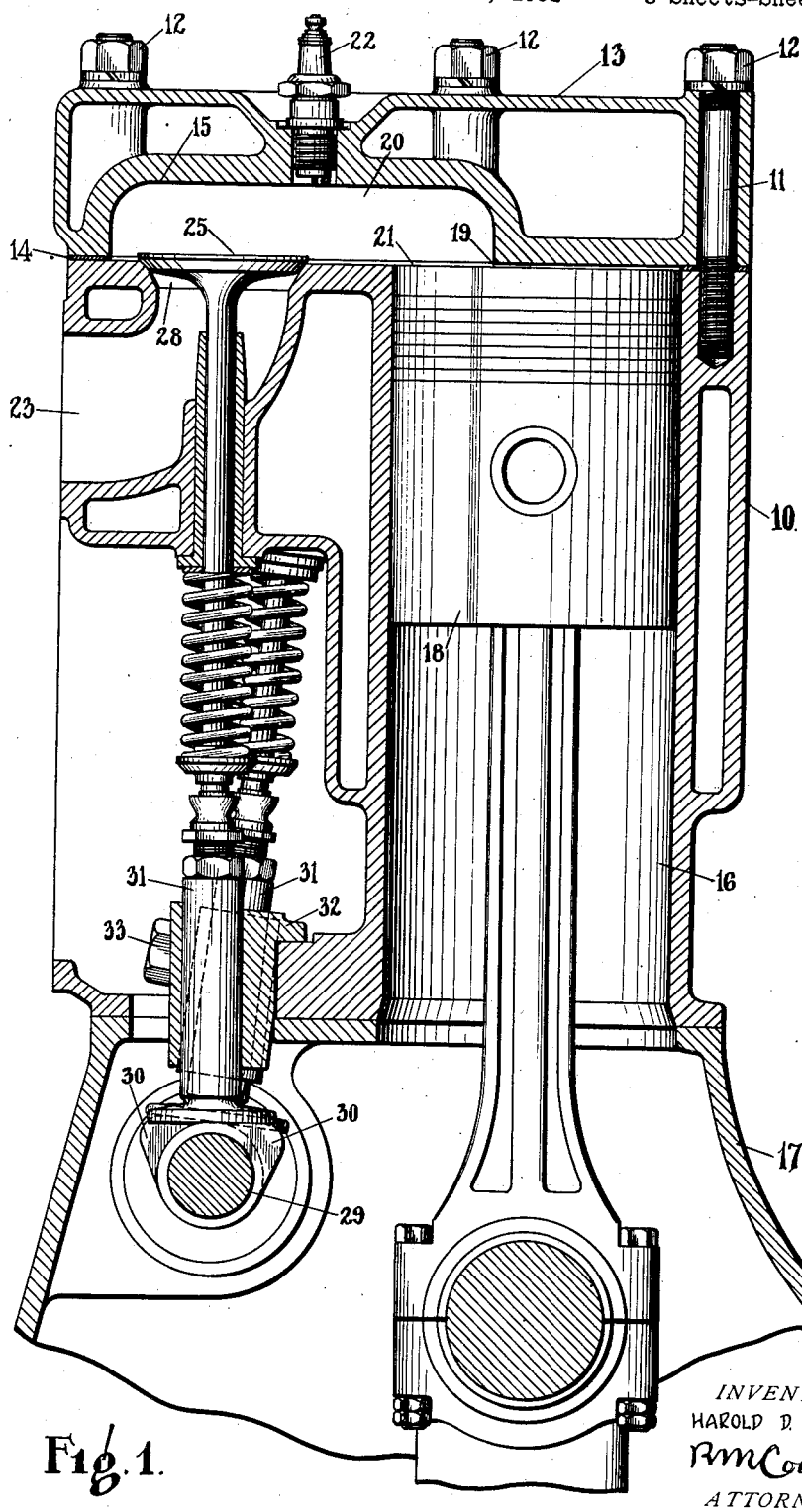
Figure 1 is a sectional view of a four cycle gasoline engine embodying this invention, the section being taken on a line corresponding with line 1—1 of Figure 3.
Figure 2:
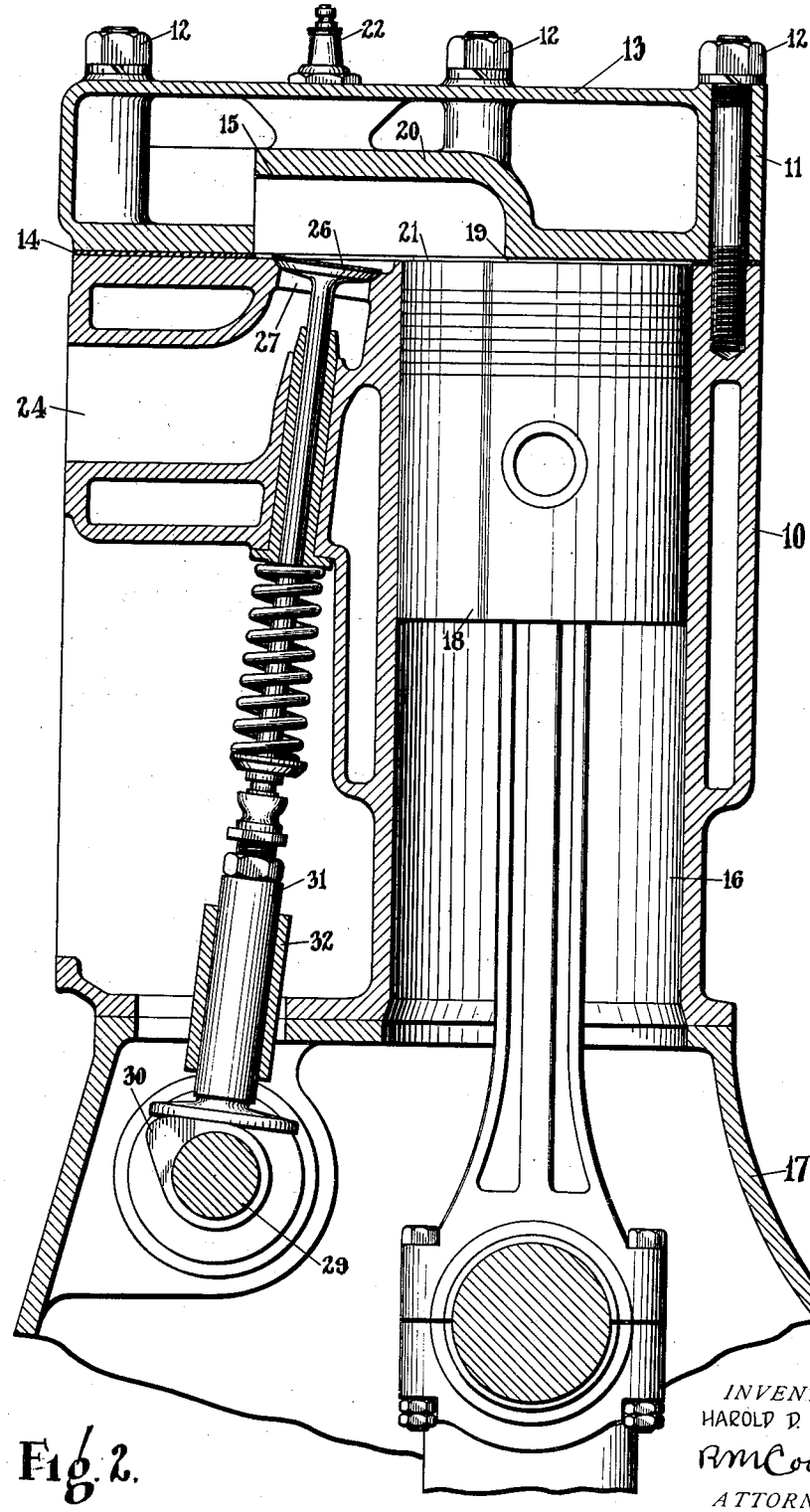
Figure 2 is a second sectional view of the engine first illustrated in Figure 1, the section being taken on a line corresponding with line 2—2 of Figure 3.
Figure 3:
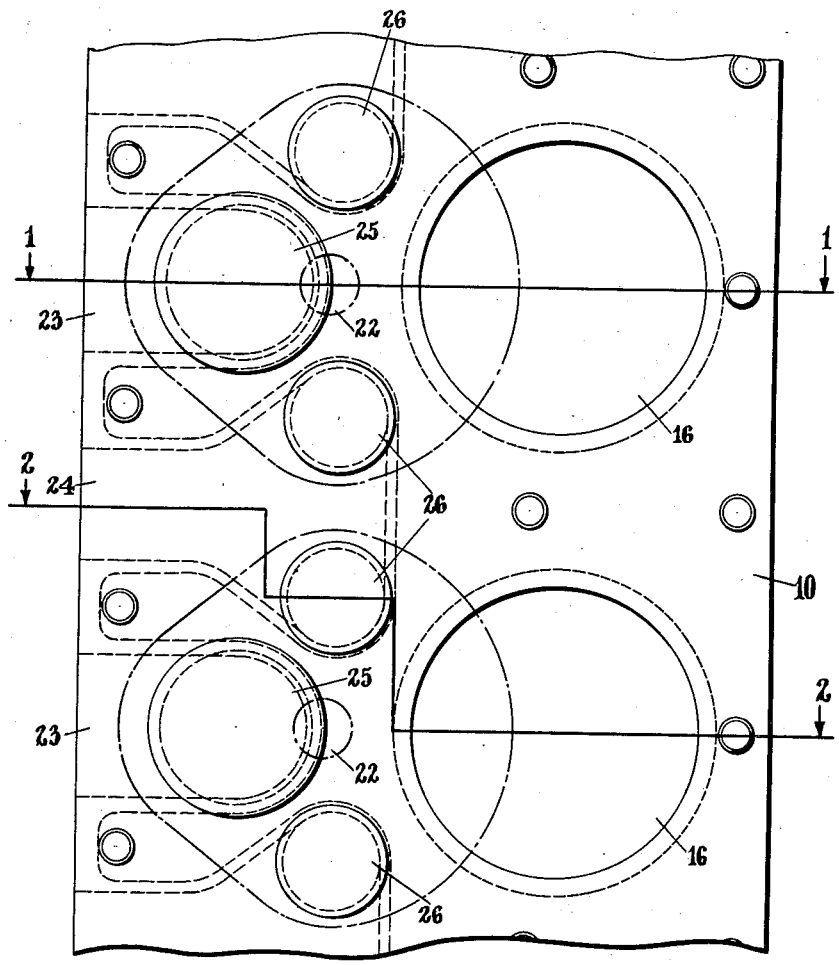
Figure 3 is a fragmentary top plan view of the cylinder block of the engine illustrated in Figures 1 and 2, the outlines of the superadjacent combustion chambers and spark plugs being shown in dot and dash lines which clearly illustrate their respective positions with respect to each other and to the block.
Figure 4:
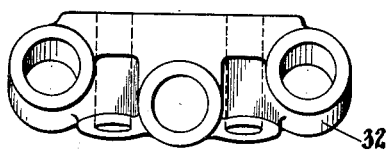
Figure 4 is a top plan view of a valve tappet guide block of the engine illustrated in the first three figures.
Figure 5:
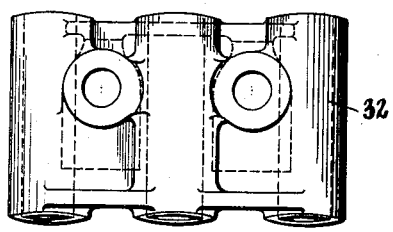
Figure 5 is a side view of a valve tappet guide block of the engine illustrated in the first three figures.

Referring to the drawings, the numeral 10 indicates the cylinder block of the engine therein illustrated. Secured to the upper end of the cylinder block in a conventional manner by means of studs 11 and nuts 12, there is a cylinder head 13, and compressed between the cylinder head and cylinder block there is a gasket 14. The cylinder head 13 is formed at one side thereof with a series of longitudinally aligned recesses 15 which correspond in number and disposition to the cylinder 16 of the block, and which are so arranged as to overlap the corresponding cylinders. The cylinder head 13 is further formed with a flat bottomed surface which extends over and closes the top of the cylinders 16 except for the overlap of the recesses 15.

Mounted in a conventional manner in the cylinder block 10 and the engine crank case 17, there is a piston, connecting rod, and crank shaft assembly so coordinated with the cylinder block and the cylinder head that the pistons 18, when at the upper ends of their strokes, are separated from the superadjacent flat surfaces of the head by small clearance spaces 19.

The recesses 15 form with the upper surface of the cylinder block 10 a series of compact chambers 20 which communicate with the cylinders 16 through restricted throats 21. These chambers serve as combustion chambers, and are each provided with a spark plug 22 mounted in the upper wall of the cylinder head, and with a large intake passage 23 and a pair of small exhaust passages 24 respectively controlled by a large inlet valve 25 and a pair of small exhaust valves 26.

The passages 23 and 24 are formed in the upper portion of the block, and are arranged in such a manner that the port openings within the separate combustion chambers are aggrouped in compact triangular relation, with exhaust ports 27 disposed inwardly of inlet ports 28. This arrangement of the passages 23 and 24 permits the construction of a shorter engine having more compact combustion chambers than could be produced by a construction in which the inlet and exhaust ports are arranged in longitudinal alignment, and in addition provides for the cooling of the exhaust valves 26 by the mixture drawn in through the intake ports 28.

The inlet and exhaust valves 25 and 26 are mounted in the upper part of the cylinder block 10 and are so inclined with respect to each other as to be capable of operation by a common cam shaft 29 mounted in the engine crank case 17. The cam shaft 29 is driven from the engine crank shaft by means of a driving connection, not shown, and is formed with a separate cam 30 for each of the valves 25 and 26, the cams for the exhaust valves 26 being so arranged as to procure synchronous operation of the two exhaust valves associated with each combustion chamber. The cams 30 operate the valves 25 and 26 through the instrumentality of tappets 31 mounted in guide blocks 32 secured to the side of the cylinder block 10 by bolts 33.

The operation of the engine is similar to that of an engine of the type disclosed in United States Patent No. 1,474,003, and will be readily understood by those skilled in the art to which this invention pertains.

Although the foregoing description is necessarily of a detailed character, in order that the invention may be completely set forth, it is to be understood that the specific terminology is not to be restrictive or confining, and that various rearrangements of parts and modifications of structural details may be resorted to without departing from the spirit or scope of the invention.

I claim as my invention:

1. In an internal combustion engine of the L-head type, the combination of a cylinder, a piston in said cylinder, an inlet conduit leading into said engine and communicating with the interior of said engine through an inlet port opening, a pair of exhaust conduits leading into said engine each communicating with the interior of said engine through an exhaust port opening, the aforesaid inlet port opening and exhaust port openings being closely aggrouped about said cylinder at one side thereof in the form of a triangle with two of said port openings disposed adjacent the cylinder, the other of said port openings being located so as to extend between the port openings adjacent the cylinder, a compact combustion chamber encompassing the aforesaid port openings in close relationship thereto and communicating with said cylinder, ignition means associated with said combustion chamber, poppet valves for controlling the aforesaid port openings, and means for operating said valves.

2. In an internal combustion engine of the L-head type, the combination of a cylinder, a piston in said cylinder, an inlet conduit leading into said engine and communicating with the interior of said engine through a large inlet port opening, a pair of exhaust conduits leading into said engine each communicating with the interior of said engine through a small exhaust port opening, the aforesaid inlet port opening and exhaust port openings being closely aggrouped about said cylinder at one side thereof in the form of a triangle with the exhaust port openings disposed adjacent the cylinder, the inlet port opening being located so as to extend between the exhaust port openings, a compact combustion chamber encompassing the aforesaid port openings in close relationship thereto and communicating with said cylinder through a restricted opening, a wall closing said cylinder at the combustion chamber end except for the aforesaid opening, so coordinated with the stroke of the piston as to be separated from the piston by a small clearance space when the piston is at the end of its compression stroke, ignition means associated with said combustion chamber, poppet valves for controlling the aforesaid port openings, and means for operating said valves.

HAROLD D. CHURCH.